US011126658B1

(12) United States Patent
Niewiadomski

(10) Patent No.: US 11,126,658 B1
(45) Date of Patent: Sep. 21, 2021

(54) SCALABLE GRAPH AUTHORING AND VERSIONING TECHNIQUES

(71) Applicant: Amazon Technologies, Inc., Seattle, WA (US)

(72) Inventor: Robert Niewiadomski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 16/129,643

(22) Filed: Sep. 12, 2018

(51) Int. Cl.
*G06F 16/00* (2019.01)
*G06F 16/901* (2019.01)
*G06F 16/28* (2019.01)
*G06F 16/21* (2019.01)

(52) U.S. Cl.
CPC ........ *G06F 16/9024* (2019.01); *G06F 16/219* (2019.01); *G06F 16/28* (2019.01)

(58) Field of Classification Search
CPC ..... G06F 16/9024; G06F 16/219; G06F 16/28
USPC ......................................................... 707/798
See application file for complete search history.

(56) References Cited

U.S. PATENT DOCUMENTS

| 5,489,886 | A  | * | 2/1996  | Wexler   | A63B 71/0605 340/323 R |
| 7,677,313 | B2 | * | 3/2010  | Tremblay | C09K 8/5083 166/293 |
| 8,336,024 | B2 | * | 12/2012 | Kannan   | G06F 8/10 717/107 |
| 8,370,798 | B2 | * | 2/2013  | Broadfoot | G06F 8/20 717/107 |
| 2005/0246711 | A1 | * | 11/2005 | Berstis | G06F 9/5077 718/105 |
| 2012/0293539 | A1 | * | 11/2012 | Shim | G09G 5/02 345/593 |
| 2014/0111627 | A1 | * | 4/2014  | Ishigami | H04N 13/302 348/51 |

* cited by examiner

*Primary Examiner* — Monica M Pyo
(74) *Attorney, Agent, or Firm* — Kilpatrick Townsend & Stockton LLP

(57) ABSTRACT

System and methods are maintaining various versions of a graph (e.g., a geometric graph) by a graph management engine. A graph may be partitioned into a number of cells (e.g., utilizing a spatial projection formula). Each cell may be associated with graph data such as nodes and/or edges that are located within the area defined by the boundaries of a cell. The graph management engine may process modifications to the graph. Upon determining that a modification is to be made to a cell, the graph management engine may generate a new cell to contain the previous cell content as modified. The new cell may be assigned a new cell identifier, and a version map corresponding to current cell version identifiers may be maintained. Subsequent data requests for graph data may be processed utilizing the version map to ensure that current graph data is provided in response to the request.

20 Claims, 8 Drawing Sheets

SCALABLE GRAPH AUTHORING AND VERSIONING TECHNIQUES

BACKGROUND

Graphs are utilized in a variety of context to model data relationships. By way of example, a graph may contain vertices and edges that represent objects. An example of a graph is a road-network graph that has vertices that represent junctions, edges that represent road segments, and vertices and edges that may be associated with attributes that include speed limits, lane counts, address ranges, and the like. Another example of a graph is a logistics-network flow graph, where vertices represents nodes in a logistics network, where edges represent flows of commodities between nodes, and where vertices and edges are associated with attributes that include commodity types, capacities, and volumes, and various upstream and downstream flow constraints. In conventional systems, when a request is received for graph data, the entire graph might be utilized to identify response data for the request. This can cause delay and scalability concerns as these systems may require that requests be processed sequentially in order to avoid data collisions with the underlying graph. In conventional systems, modifying a graph may cause multiple versions of the entire graph to be stored, which in turn presents drawbacks with respect to data storage.

BRIEF DESCRIPTION OF THE DRAWINGS

Various embodiments in accordance with the present disclosure will be described with reference to the drawings, in which.

DETAILED DESCRIPTION

Figure 1:
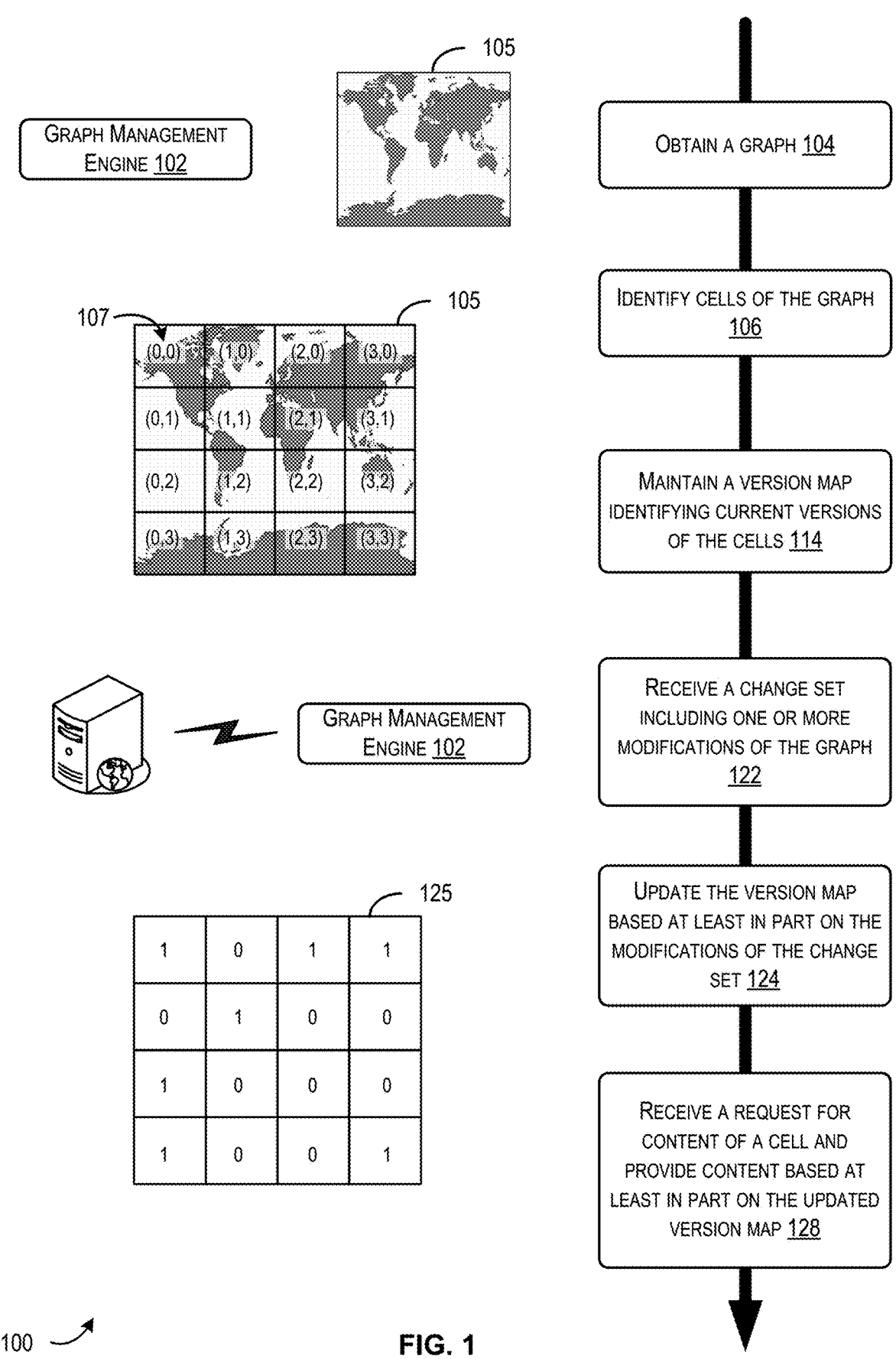
FIG. 1 illustrates a flow for providing graph versioning techniques utilizing a graph management engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described above, a "graph" (e.g., a "geometric graph") may include nodes and edges, where various nodes connect at least some of the edges of the graph. In some embodiments, a graph may represent a road-network. Each edge of the graph may be associated with various attributes (e.g., name of a road, allowed traversal direction(s), address range(s), speed-limit(s), surface material(s), road grade, street signs/lights, or any suitable attribute of the segment). In some embodiments, nodes of the graph may be associated with attributes that indicate properties related to the node (e.g., name(s) of roads connected by the node, street signs/lights, surface material, intersection information such as allowed traversals between edges connected by the nodes, etc.). As used herein, a "cell" may relate to a sub-region of the graph. A "cell" may include an entry in a content map that maps a cell identifier to cell content, a cell object having any suitable number of content attributes, or any suitable storage container for storing data (e.g., geographic location(s) and/or boundaries for identifying an area associated with a cell, a spatial index, a cell identifier, a version identifier, etc.) and/or content (e.g., node(s)/edge(s) identifier(s), etc.) associated with a sub-region of the graph.

Techniques described herein are directed to systems and methods for managing versions of a graph. In some embodiments, a graph may be obtained. The graph may be associated with a geographic region. This graph could be one of many maintained by a graph management engine and initially obtained from any suitable source such as from data storage and/or a commercial graph provider. Once obtained, a spatial projection technique (e.g., utilizing a spatial projection formula) may be applied to the graph to identify cells of the graph.

Through application of the spatial projection formula, the cell boundaries may be identified as well as an index (also referred to as a "spatial index") and/or other suitable identifier for the cell. Utilizing the spatial projection formula, each node (e.g., vertex) and each edge of the graph may be mapped to a corresponding cell. By way of example, the location(s) associated with a vertex and/or edge may be provided to a spatial projection formula to identify one or more cell(s) corresponding to a geographic sub-region within which the vertex or edge is located. The vertex and/or edge may be associated with a cell identifier and stored as contents (or associations) of the cell. In some embodiments, a cell may be a data object configured to store any suitable number of attributes such as any suitable number of vertex and/or edge identifiers. In some embodiments, a content map may contain entries indicating the content associated with a cell identifier. Regardless of the storage scenario, a cell identifier may be utilized to identify the data object or content map entry from which cell content may be accessed. The graph management engine may additionally maintain a version map (also referred to as a "cell version map") indicating a version identifier for each cell. In some embodiments, entries of the version map and/or the content map may be provided for every cell of the graph and each entry may initially be set to a default value (e.g., 0). In other embodiments, the content map may not include entries for cells and/or a cell object may not be maintained for cells in which there are no vertices and/or edges. Similarly, in some embodiments, the version map may not include entries for cells that either have no vertices and edges.

Over time, the graph may be updated. For example, a change request including one or more modifications to the graph may be received. The one or more modifications may be referred to as a "change set." The graph management engine may be configured to identify a set of cells to which the one or more modifications relate. In some embodiments, a cell identifier and/or a version identifier of a cell may be included in the change set. The graph may be modified according to the change set to modify one or more nodes and/or edges. In some embodiments, such as when cell identifiers and/or version identifiers may not be provided in the change set, the graph management engine may determine, based on the spatial projection formula and the location(s) of the node/edges to be modified, particular cells that are to be changed. When applying the modifications of the change set, the graph management engine may create a new version of the cell (e.g., a new content map entry, a new cell object, etc.) that includes the contents of the cell as modified in accordance with the change request. A new cell identifier may be generated for the new version of the cell and the version map may be updated to indicate a new version identifier for the cell. In some embodiments, a "cell identifier" may be include any suitable combination of an identifier for the version map, an identifier for the cell, and/or a cell version identifier. Once updated, the version map may be provided to any suitable computing device. In some embodiments, this may entail storing the current version map at a particular storage location from which other computing device may obtain the current version map. Additionally, or alternatively, the version map may be provided by the graph management engine directly to one or more computing devices. Regardless of the manner in which the version map is obtained, the computing device may store the version map in memory for later utilization.

In some embodiments, a request for graph data may be received (e.g., by the graph management engine). The request may include one or more cell identifiers corresponding to one or more cells associated with the graph. The cell identifier(s) of the request may include an indication of a version identifier for the version of the cell requested. It should be appreciated that although in some embodiments, the version identifier of a cell may be included in a cell identifier for the cell, it is contemplated that the version identifier and the cell identifier may be separate identifiers. Upon receipt, or at another suitable time, the graph management engine may utilize the cell identifier and the version identifier to identify a particular cell. The content associated with the identified cell may be retrieved from the content map and provided in response to the request.

It should be appreciated that in some embodiments, hierarchical maps associated with the graph may be utilized for modifications and/or graph data requests. For example, cells of the graph may define a particular granularity of the graph which may relatively fine grained. "Blocks" may be utilized to identify coarser granularity sub-portions (larger sub-portions) of the graph. A "block" may be an object and/or a map that may be utilized to maintain an association to a number of cells. In some examples, while a cell version map may be utilized to maintain cell versions, a block version map may be configured to maintain cell versions for a subset of cells corresponding to a block of the graph. Read/write operations (e.g., graph data requests and/or change set modifications) discussed herein may be performed utilizing cell identifiers (for finer granularity changes/retrievals) and/or block identifiers (for courser granularity changes/retrievals).

In some embodiments, graph data (e.g., the graph, any suitable number of cells associated with the graph, any suitable number of blocks associated with the graph, one or more version maps (e.g., cell version map(s), block version map(s), etc.), one or more content maps (e.g., cell content map(s), block content map(s), etc.) may be stored in a path-based data-storage system. In some embodiments, a path-based data storage system may include storage systems in which a path (e.g., a uniform resource locator) and/or a key is utilized to retrieve data from a database. In some embodiments, the path-based data storage system may be a cloud-based NoSQL database (e.g., Amazon's S3 Web Service, DynamoDB®, etc.). By utilizing these storage systems, in conjunction with the data models (e.g., cells, blocks, maps, etc.), geographic data partitioning, and incremental versioning discussed herein, provide for performance-efficient spatial-querying and memory-efficient versioning.

Embodiment discussed herein may provide numerous benefits over conventional graph management techniques. For example, unlike current systems that may access an entire graph for determining data to be provided in a response, the techniques discussed herein allow for subportions of the graph to be modified and/or accessed without accessing the remaining portions of the graph. By way of example, a change request may modify only particular cells and/or blocks of the graph and not others. Accordingly, only the cells/blocks that are being modified may be accessed and only the changes to those cells/blocks may be stored. Accordingly, the systems and method herein enable client computing devices to write data in a decentralized and concurrent manner. Similarly, the techniques discussed herein provide performance and efficiency improvements for read operations. That is, request for data of the graph (e.g., a read request) is received, only the cells/blocks identified may be accessed to retrieve the graph data requested. Accordingly, the techniques described herein enable client computing devices to read data in a decentralized and concurrent manner. Still further, because the content for requested cells/blocks is provided in response to a request and not the entire graph contents, as would be the case conventionally, the techniques discussed herein provide performance and scalability improvements by reducing the amount of data that is provided in response to a request. That is, unless a request pertained to the entire graph, the entire graph contents would not be provided. Accordingly, the techniques described herein provide improvements in data storage and data retrieval.

FIG. 1 illustrates a flow 100 for providing graph versioning techniques utilizing a graph management engine 102, in accordance with at least one embodiment.

At 104, the graph management engine 102 may obtain a graph (e.g., graph 105). In some embodiments, the graph management engine 102 may be responsible for processing graph changes and for publishing changes made to the graph. The graph 105 may be an example of a commercially available graph provided by a graph provider. The graph 105 may include any suitable number of nodes and edges which represent a traversal network (e.g., a road-network). The edges of the graph 105 may correspond to traversal segments (e.g., roads) and the nodes of the graph 105 may connect the edges of the graph 105.

At 106, the graph management engine 102 may identify cells of the graph. In some embodiments, the graph management engine 102 may execute a spatial projection formula with the graph to identify these cells. For example, the spatial projection formula (e.g., a rectilinear projection formula, a spatial mercator projection formula, etc.) may be utilized to identify spatial indices for a number of cells. By executing the spatial projection formula, the graph may be partitioned into a set of disjoint components (e.g., cells). In addition to enabling the definition of cell boundaries, the spatial projection formula may enable each cell to be uniquely identifiable by a cell identifier and/or a spatial index. The spatial index may conform to a coordinate system such as, for example, (i, j) in which i represents a column and j represents a row of the graph 105. One example index is depicted at 107 (e.g., (0,0)) which represents a cell at the first column and the first row of the graph 105. The assigned coordinate may be utilized to identify the cell, although in some embodiments, a cell identifier (e.g., any suitable alphanumeric value) may be generated and assigned to each cell. In some embodiments, the cell identifier may include the spatial index. The contents of each cell my additionally be ascertainable utilizing the spatial projection formula as will be discussed in further detail with respect to FIG. 2.

At 114, the graph management engine 102 may maintain a version map (e.g., version map 125 with all cells being assigned "0" by default) identifying current versions of the cells. By way of example, the graph management engine 102 may generate a new version map (if one is not already in existence) containing an entry for each cell identified at 106. In some embodiments, the versions may initially be assigned a default value (e.g., 0, null, etc.) indicating that the current version of the cell is the original version of the cell. In some embodiments, a version identifier may be assigned to each cell and a cell identifier and/or the version identifier of the cell may be utilized to identify a particular cell of the graph 105. In some embodiments, a cell identifier and a version identifier may be separate values utilized separately to identify a cell. In other embodiments, the cell and version identifiers may be combined (e.g., concatenated) to identify a particular cell containing the graph contents corresponding to the particular version identifier.

At 122, a change set may be received (e.g., by the graph management engine 102).

The change set may indicate one or more modification of the graph 105. By way of example, a node and/or an edge of the graph 105 may be added, modified, and/or deleted. In some embodiments, the graph management engine 102 may perform the modifications of the change set on the graph 105. As part of modifying the graph, the graph management engine 102 may generate new cells (e.g., new cell objects and/or new cell content maps identifying the content of particular cells) to reflect the changes. The new cells may contain the modified contents. A new cell may be associated with a new cell identifier and/or a new version identifier. In some embodiments, a new version identifier may be generated by incrementing the value of the previous version identifier for the cell. However, any suitable method for generating a version identifier for a cell may be utilized. The new cell may then be identified using its corresponding cell identifier and/or version identifier.

At 124, the graph management engine 102 may update the version map 125 (e.g., initially defaulted to 0 for each cell). By way of example, the graph management engine 102 may identify the cells to which the modifications of the change set relates and for which new cells and/or cell contents were generated and/or for which new version identifiers were generated. The graph management engine 102 may store the new version identifiers of the new cells within the version map 125. The version map may be in any suitable form. By way of example, the version map may be any suitable container (e.g., an object, a map, etc.) in which the version of a particular cell may be ascertainable utilizing, for example, cell identifier for the cell. In some embodiments, the version map 125 may be associated with a graph version number. This graph version number may be any suitable identifier from which the version map 125 may be retrieved.

In some embodiments, the graph management engine 102 may be configured to provide the version map 125 to any suitable number of computing devices. For example, the graph management engine 102 may be configured to store the version map 125 (or many version maps) of the graph 105 at a predesignated storage location from which the version map 125 may be retrieved (e.g., by other computing devices).

At 126, a request for content of a cell may be received. In some embodiments, the request may include the cell identifier and the version identifier for one or more cells. Utilizing the cell identifier and the version identifier, the graph management engine 102 may be configured to retrieve cell contents associated with the cell identifier(s) and the version identifier(s) and provide the retrieved cell contents in response to the request. In some embodiments, the request may not include a version identifier. Accordingly, the graph management engine 102 may utilize a most-current version map to identify a current version corresponding to a cell identifier of the request. Once known, the version identifier may be utilized to retrieve specific cell contents corresponding to the cell identifier and the version identifier. These cell contents may then be provided in response to the request.

In still further embodiments, the request may include a location (or area) identified via one or more location coordinates (e.g., latitude/longitude values identifying a location and/or an area). The graph management engine 102 may be configured to identify particular cells utilizing the location coordinates of the request with the spatial projection formula. Once the cells are identified, the graph management engine 102 may respond to the request with the content of the identified cells.

Figure 2:
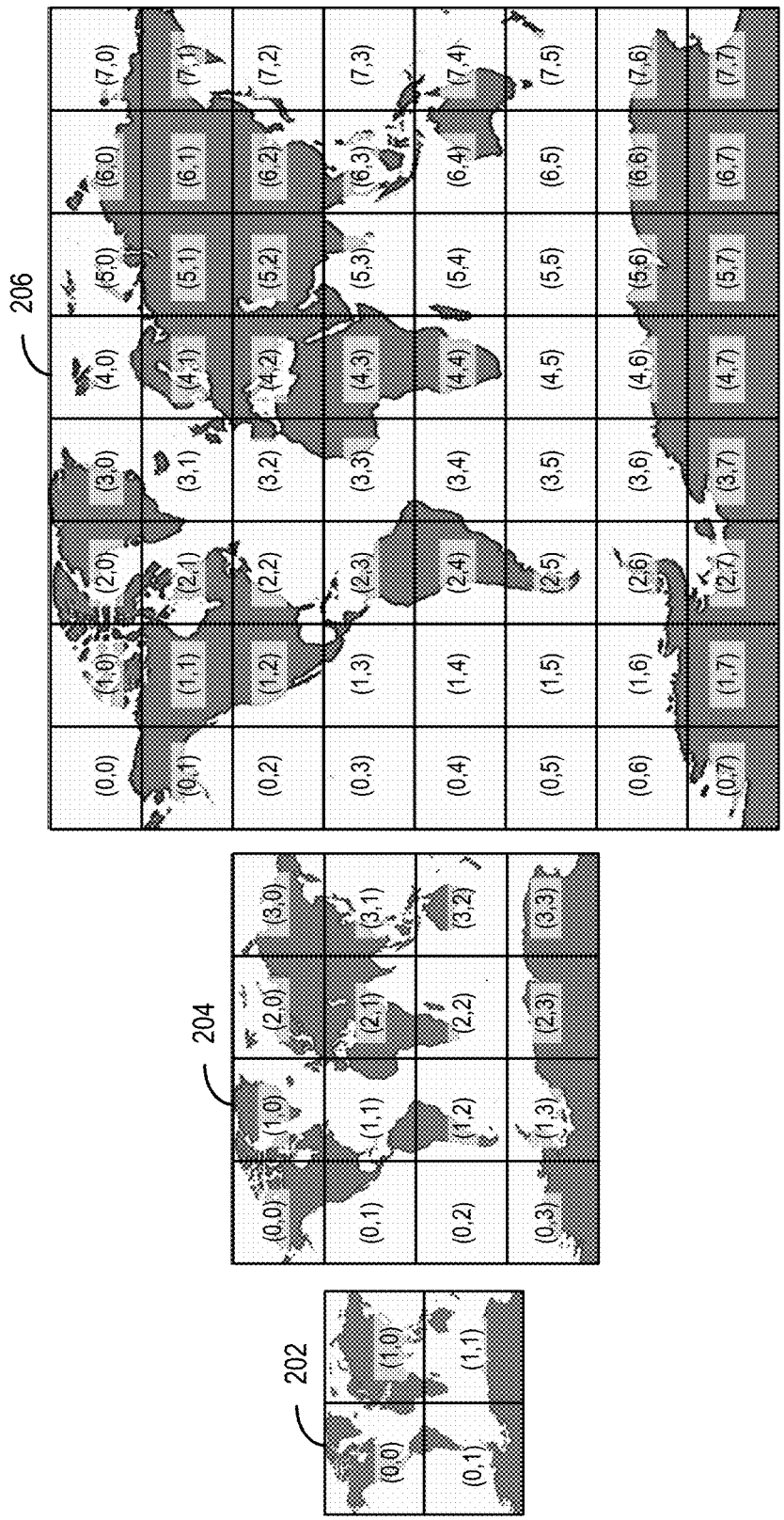
FIG. 2 is a schematic diagram illustrating multiple sets of cells of a graph, each set of cells being identified utilizing the graph management engine, in accordance with at least one embodiment.

FIG. 2 is a schematic diagram illustrating multiple sets of cells of a graph (e.g., graph 105 of FIG. 1), each set of cells being identified utilizing the graph management engine (e.g., the graph management engine 102 of FIG. 1), in accordance with at least one embodiment. The graph 105 is depicted as being partitioned at three different granularities. For example, graph 202 depicts the resultant cells identified utilizing a spatial projection formula at a first granularity. Graph 204 depicts the resultant cells identified utilizing the spatial projection formula at a second granularity that is finer than the first granularity. Graph 206 depicts the resultant cells identified utilizing the spatial projection formula at a third granularity that is even finer than the second granularity. The particular granularity utilized by the graph management engine 102 may be predetermined and/or based at least in part on storage constraints associated with the graph management system 500 discussed further below with respect to FIG. 5.

One example of a spatial projection formula includes a rectilinear projection formula. A rectilinear projection formula may be utilized to map the latitude and longitude coordinate ranges of [−90, 90] and [−180, 180], respectively, onto the projected latitude and longitude coordinate ranges of [0, 180] and [0, 360], respectively. The resulting projected coordinate ranges may then be partitioned at a regular interval referred to as the cell granularity. Let δ denote the cell granularity. The index may be configured with a cell granularity such that 180 mod δ=0 and 360 mod δ=0. The resulting partitions may define cell boundaries as [iδ, (i+1)δ) for projected latitude coordinates and [jδ, and (j+1)δ) for projected longitude coordinates, where $0 \leq i < 360/\delta$ and $0 \leq j < 180/\delta$, with each cell being uniquely identified with the label (i, j).

As another non-limiting example, a spherical mercator projection formula may be utilized to identify cell boundaries and contents. With a Spherical Mercator projection formula, the latitude and longitude coordinate ranges of [−90, 90] and [−180, 180], respectively, may be non-linearly mapped onto the projected latitude and longitude coordinate ranges of [0, 360] and [0, 360], respectively. In comparison to the Rectilinear index, the Spherical Mercator index may provide the advantage of featuring cell boundaries that can be seamlessly aligned with the boundaries of raster-based map-tile products from most map-data vendors. An alignment may be achieved by selecting a cell granularity of 360/2i where i≥0. The alignment may allow for the direct utilization of such products for graph visualization, thereby eliminating the need for prohibitively expensive transformation and stitching computations, the application of which is prone to introducing artifacts not present in the original graph.

The graph management engine 102 of FIG. 1 may utilize any suitable spatial projection formula to identify the cell boundaries of the graph 105 according to any suitable granularity. As a non-limiting example, due to storage constraints, throughput and/or other performance factors, the graph management engine 102 may be configured to utilize the spatial projection formula to identify cells according to the granularity depicted with graph 204. Utilizing the spatial projection formula, the graph management engine 102 may generate a cell identifier for each cell depicted in graph 204.

The graph management engine 102 may further utilize the spatial projection formula to identify cell content for each cell of the graph (e.g., the graph 202, the graph 204, and/or the graph 206). For example, a given location, associated with a node or an edge (or portion of an edge) of the graph 204, may be provided to the spatial projection formula to determine a cell within which the node/edge is located. By way of example, the spatial projection formula may be utilized to determine that a node location (e.g., corresponding to a particular latitude and longitude) is located within a particular cell boundary (cell (1,0)). Accordingly, the graph management engine 102 may update a content map (or a cell object corresponding to the cell) to indicate that the node is located within the particular cell. This process may be repeated any suitable number of times in order to associated each node and each edge of the graph with a corresponding cell. By utilizing the spatial projection formula, the graph management engine 102 may generate a number of cell objects and/or a content map indicating the boundaries (e.g., latitude and/or longitude boundaries) for each cell as well as the cell contents for each cell (e.g., any suitable number of nodes and/or edges contained within the cell boundaries).

Figure 3:
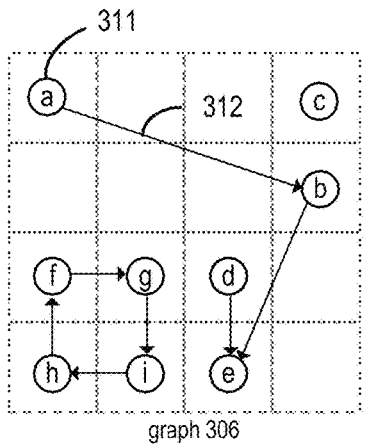
FIG. 3 is a schematic diagram illustrating exemplary techniques for maintaining a cell version map, in accordance with at least one embodiment.
Figure 3:
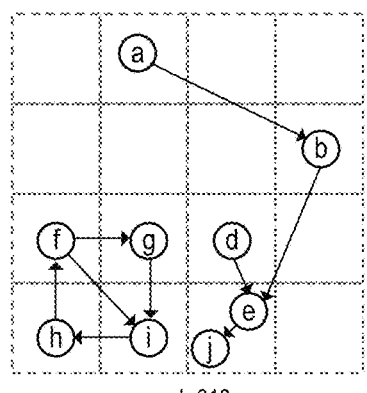

FIG. 3 is a schematic diagram illustrating exemplary techniques for maintaining a cell version map, in accordance with at least one embodiment. FIG. 3 may illustrate techniques for providing multiple version maps in accordance with changes provided to the graph over time. A graph (e.g., the graph 204 of FIG. 2) may be stored as cells and/or cell content entries of a content map. A brief explanation of cells, nodes, and edges is provided for benefit of the reader.

As described above, each cell of a graph (e.g., the graph 204) may correspond to a sub-portion of the graph that is produced by partitioning vertices based on their location relative to cell boundaries. For example, for each vertex (e.g., node) u, a container cell of u may be the cell whose boundaries contain the location u. The container cell (e.g., a cell object, a content map entry) of u may include u's coordinates (e.g., the latitude/longitude boundaries of u), a spatial index, a cell identifier (which may be the spatial index or include the spatial index), and any suitable attribute of u, an indication and/or edge attributes of each outgoing edge (e.g., for example an edge from cell u to v may be described as "edge (u, v)"), and an indication and/or edge attributes of each incoming edge (e.g., an edge from cell w to u may be described as "edge (w, u)"). In some embodiments, to reduce a storage footprint associated with a cell, the graph management engine 102 may be configured to store a partial set of attributes associated with an edge (e.g., an incoming edge to the cell u) for example, the identity of the node v and/or the identity of the container cell of v. By identifying node v, rather than storing attributes associated with the portion of the edge contained within the cell v, the graph management engine 102 may avoid storing duplicative data within multiple cell containers. Additionally, by storing the identity of node v, the graph management engine 102 may identify additional cells whose content may be affected by a change set without having to access cells other than the container cell affected.

In some embodiments, each node and edge of the graph may be associated (e.g., by the graph management engine 102) with an attribute identifier. In some examples, these attribute identifiers may remain constant for the life of the graph. In some embodiments, the attribute identifier may correspond to a counter maintained by the graph management engine 102. For example, a first node/edge identified may be assigned an attribute identifier of "1," while the next node and/or edge identified may be assigned an attribute identifier of "2." This is merely an example, it should be appreciated that the graph management engine 102 may utilize any suitable manner of generating a unique identifier for each edge and/or node of the graph. The attribute identifier for the node and/or edge may be associated with additional information. For examples, and attribute identifier for an edge may be associated with further information such as an indications that the edge connects nodes a and b, a directionality of the edge, or any suitable attribute associated with an edge.

In some embodiments, graph versions may be sequential and may begin at zero. Rather than storing explicit instances of graph versions, the system may store implicit instances (e.g., versions) of the graph by utilizing version maps. A version map may define a version for each cell of the particular version of the graph. As in the case of graph versions, cell versions may be sequential and may begin at zero. In order to save storage space and reduce computation, the system may not store instances of cells/content map entries that are empty. For example, version zero instances of cells/content map entries may not be stored. In some embodiments, instances of cells/cell entries that become empty (e.g., due to graph editing operations) may not be stored. In the case of the latter, the system may record utilize a cell version identifier (e.g., a negative cell version number) to indicate that the cell instance is empty. As a non-limiting example, cells/cell entries corresponding to bodies of water may never be stored for a graph that represents a road-network when a road (e.g., a bridge) does not traverse the body of water.

Returning to FIG. 3, the graph management engine 102 may obtain a graph (e.g., the graph 105) of FIG. 1. Initially, the graph management engine 102 may utilize the spatial projection formula discussed above to determine a number of cells for the graph 301. Utilizing the granularity associated with graph 204 of FIG. 2, for example, the graph management engine 102 may determine that 16 cells are needed to represent the graph 204. In some examples, 16 cell objects may be instantiated and their corresponding contents initialized to a default value (e.g., 0). Additionally or alternatively, a content map (e.g., content map 302) may be generated to include 16 entries, where each entry of the content map described the contents of a corresponding cell. The content map entries may be initialized to a default value (e.g., 0) as depicted in FIG. 3. The graph management engine 102 may additionally generate version map 304 to maintain version identifiers for each cell corresponding to content map 302. The versions of each cell may also be initialized to a default value (e.g., 0).

The graph management engine 102 may obtain a graph 306 (e.g., the graph 204). Graph 306 may represent the nodes and edges of the graph 204 of FIG. 2. The graph management engine 102 may identify each node (e.g., nodes A-I) and each edge of the graph 306. Utilizing the spatial projection formula, the graph management engine 102 may identify cells that individually corresponding to each node and/or edge of the graph 306. It should be appreciated that the number of cells (e.g., 16) is utilized for exemplary purposes and any suitable number of cells, according to any suitable level of granularity, may be utilized. The content map 310 may be generated accordingly. The content map 310 may include the unmodified entries of content map 302 and new entries corresponding to modified cells. By way of example, node 311 and edge 312 (e.g., edge(a, b) representing the edge between nodes a and b) may be associated with a corresponding content map entry (e.g., content map entry 314). In some embodiments, the edge(a,b), may indicate a direction of travel (e.g., the edge is unidirectional such that travel may only occur in the direction from node a to b). In other embodiments, the edge(a,b) may be bidirectional.

It should be appreciated that embodiments are contemplated in which cells may correspond to data objects that include attributes corresponding to the nodes and/or edges of the cell. Thus, in some embodiments, the content map 310 of FIG. 3 may instead depict a number of cell objects. In these embodiments, the graph management engine 102 may generated new cells for each cell in which a node and/or edge was added. For example, a first cell object may be utilized to store content of the content map entry 315, while a different cell object may be utilized to store the content of content map entry 314. Although it should be appreciated that in some embodiments, a cell object may not be maintained for the content map entry 315, nor for any cell boundary in which no nodes or edges of the graph 306 appear. Generally, however, a different cell and/or content map entry may be generated by the graph management engine 102 when the contents associated with a cell are changed.

The graph management engine 102 may determine each cell (e.g., each content map entry of the content map 310 and/or each newly generated cell object) for which a node and/or edge was added. The graph management engine 102 may generate a new version identifier for each modified/added cell/content map entry. The new version identifiers are depicted at version map 316. In some embodiments, the version identifiers may be any suitable alphanumeric identifier. In some embodiments, the graph management engine 102 may increment the previous version identifier (e.g., a cell version number) of the cell to generate the new version identifier.

The version map 316 may be disseminated to a number of computing devices and/or the graph management engine 102 may store the version map 316 in any suitable location (e.g., a predetermined location from which the graph management engine 102 and/or other computing devices may retrieve the version map 316). The version map 316 and/or the content map 310 may be associated with a graph version indicating a particular version of the graph 306. The version map 316 and the content map 310 may then be utilized by the graph management engine 102 to retrieve data for that version or the graph in response to subsequent data requests.

In some embodiments, the graph management engine 102 may receive/obtain a change set to modify the graph 306 to the graph 318. A change set may include a number of operations that include at least one of an addition, a removal, or an update to contents of the graph. Each operation may correspond to one or more vertices/nodes and/or one or more edges of the graph. In some embodiments, a change set modification may also identify the cell identifier and/or version identifier to which the modification is to be applied. In some embodiments, the graph management engine 102 may receive/obtain the change set corresponding to the changes between graph 306 and graph 318 from any suitable source. In some embodiments, the graph management engine 102 may identify these differences by comparing the graph 318 to the graph 306 to determine a change set for modifying the graph 306 to the graph 318.

In light of the change set, the graph management engine 102 may determine each cell (e.g., of the content map 310 and/or each cell object) for which a node and/or edge is to be modified. The graph management engine 102 may generate a new content map entry (and/or a new cell object) to contain the modified contents of the cell. In some embodiments, the graph management engine 102 may modify previous content map entries (and/or cell objects). By way of example, a modification detected or provided may indicate that the vertex/node "a" has moved from one cell to another. Accordingly, the graph management engine may modify content map entry 320 to indicate that there are no nodes and/or edges with the corresponding cell. The graph management engine 102 may further modify content map entry 322 to indicate that vertex/node "a" and edge(a,b) are now located within the cell corresponding to content map entry 322. In some embodiments, the content map entry 322 may be a newly generated entry of the content map 324 and/or the content map entry 322 may represent a modified version of the content map entry 326 of content map 310. In embodiments, in which cell entries are represented by cell objects, the content of a previous cell object corresponding to the content map entry 322 may be modified or a new cell object may be generated to contain the contents indicated by the content map entry 322.

The graph management engine 102 may generate a new version identifier for each modified cell object/content map entry and store these version identifiers within version map 328. Version map 328 may be the same version map as version map 316 after the change set has been applied, or the version map 328 may be stored as a version map that is separate from the version map 316. Each of the version maps 328 and 316 may be associated with a graph version identifier with which the version map is identifiable. In some embodiments, the version identifier for cells that have become empty based on the most-recent modifications may be assigned an identifier that indicates that the cell has newly become empty (e.g., a negative version identifier). For cells that have recently become empty, the graph management engine 102 may delete a corresponding cell object and/or content map entry to reduce storage requirements and/or the computational burden on the system. In some embodiments, the graph management engine 102 may increment the previous version number of the cell to generate the new version identifier for modified cell contents as is depicted at 330.

In some embodiments, the version map 316 and/or 328 may be disseminated to a number of computing devices and/or the graph management engine 102 may store the version map 316 and/or 328 in any suitable location (e.g., a predetermined location from which other computing devices may retrieve the version map 316 and/or 328). The version map 316 and/or the content map 310 may be associated with a graph version indicating a particular version of the graph 306. The version map 316 and the content map 310 of the version map 328 and the content map 324 may then be utilized by the graph management engine 102 to retrieve data for that version or the graph in response to request for graph data.

In some embodiments, the graph management engine 102 may determine that a change set applies to a version of the graph that is outdated (e.g., the modifications do not relate to current cell content and/or the modifications are identified as relating to an older graph version). In these cases, the graph management engine 102 may be configured to reject the change set. In some embodiments, the submitted of the change set may be notified by the graph management engine 102 and prompted to utilize the most receive graph (e.g., as indicated utilizing a graph version identifier) to provide changes.

Figure 4:
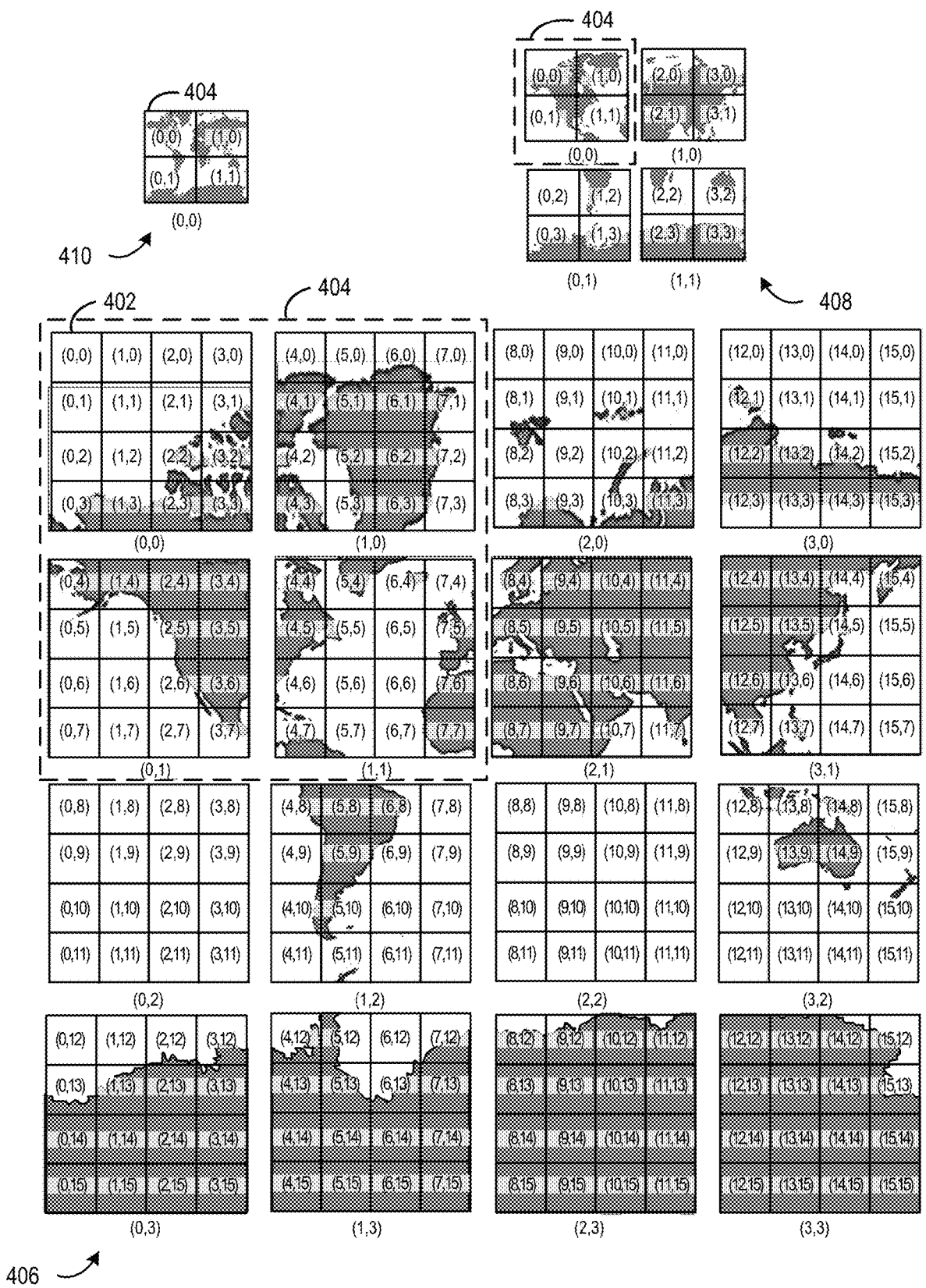
FIG. 4 is a schematic diagram illustrating exemplary techniques for maintaining hierarchical version maps, in accordance with at least one embodiment.

FIG. 4 is a schematic diagram illustrating exemplary techniques for maintaining hierarchical version maps, in accordance with at least one embodiment. In some embodiments, the graph management engine 102 can be configured to maintain a hierarchy of version maps that correspond different granularities of a spatial index that is utilized to define cells. For example, the spatial projection formulas discussed herein may be utilized to identify cells (e.g., cell 402) corresponding to relatively fine-grained spatial index. The cells may relate to a "block" (e.g., block 404) associated with one or more coarser-grained spatial indices. In the example depicted in FIG. 4, the graph management engine 102 may utilize a spatial projection formula to identify a set of spatial indexes for cells, and a separate set of spatial indices associated with blocks having a coarser granularity, and yet another set of spatial indices associated with another set of blocks having an even coarser granularity. In some embodiments, the spatial projection formula may be utilized to identify cells and cells may be grouped to define blocks, and blocks may be grouped to form higher level blocks. Any suitable depth of the hierarchy is contemplated.

A block may be associated with any suitable number of cells which are located within an area defined for the block. This concept is depicted in FIG. 4 where a set of cells are depicted at 406, a first set of blocks associated with the cells are depicted at 408, and a second set of blocks associated with the first set of blocks is depicted at 410.

In some embodiments, the graph management engine 102 may maintain a tree (or another relationship mapping) for maintaining relationships between cells and/or blocks. In some embodiments, each cell version map may be maintained as a bottom-most leaf of the tree.

Moving up a level of the tree, the graph management engine 102 may maintain a first set of block version maps, the block version map may maintain each version identifier for the set of cells (e.g., descendent cells) to which the block is associated. Moving up another level of the tree, the graph management engine 102 may maintain a second set of block version maps where each of these maps maintain version identifiers for the descendent block(s) (of the first set of blocks) associated with each parent block.

It should be appreciated that the graph management engine 102 may utilize block version maps in a similar manner and/or in conjunction with cell version maps described above. For example, a change set may modify contents of a particular cell. The graph management engine 102 may generate a new version identifier for the cell and maintain this version identifier in a cell-version map (e.g., the version map 316 of FIG. 3). The graph management engine 102 may additionally modify a block map (e.g., a block map associated with the cell) to include the newly generated version identifier for the cell. That block map may be assigned a new block version identifier by the graph management engine 102 and the new block version identifier may be utilized to update another block version map for a block further up the hierarchy.

In some embodiments, in addition to not storing instances of cells that are empty, the system may also refrain from storing instances of cell version maps entries for cells instances that are all empty. Likewise, the system may not store instances of block version maps that define cell-version maps and/or cells that indicate that all of the cells are all empty. Similarly, the system may refrain from storing higher-level block version maps that define lower-level block versions that indicate that the corresponding blocks are all empty. In a similar manner as described above in connection with cell modifications, cells which may become empty may be represented with negative cell version identifiers. Negative block version identifiers may be similarly utilized to indicate that the block instance has recently become empty.

A number of advantages may be realized through the utilization of the hierarchical version maps depicted in FIG. 4. For example, in order to allow for efficient spatial-querying of the graph for clients and graph management engine 102 alike, as well as to maximize the efficiency of processing of change sets whose operations are spatially collocated, the cell index could be configured with an adequately small cell granularity. For example, with a cell granularity of 360/215, each cell may cover approximately 1 $km^2$ of area. When each cell covers approximately 1 $km^2$, the processing of a change set that modifies a section of a road (e.g., an edge), for instance, may result in the reading and writing of the handful of cells that contain the affected edges, likely amounting to a few KB of data. However, with the standard cell-version map representation, independent of the change set, the system might be required to read and write a much greater amount of data (e.g., a total of 1 billion cell version values, which, when using 32-bit integers, corresponds to a 4 GB of data). By contrast, with hierarchical cell-version map representation, the system could read and write a few KB of data consisting of cell version values, cell-version maps, and block-version maps.

Figure 5:
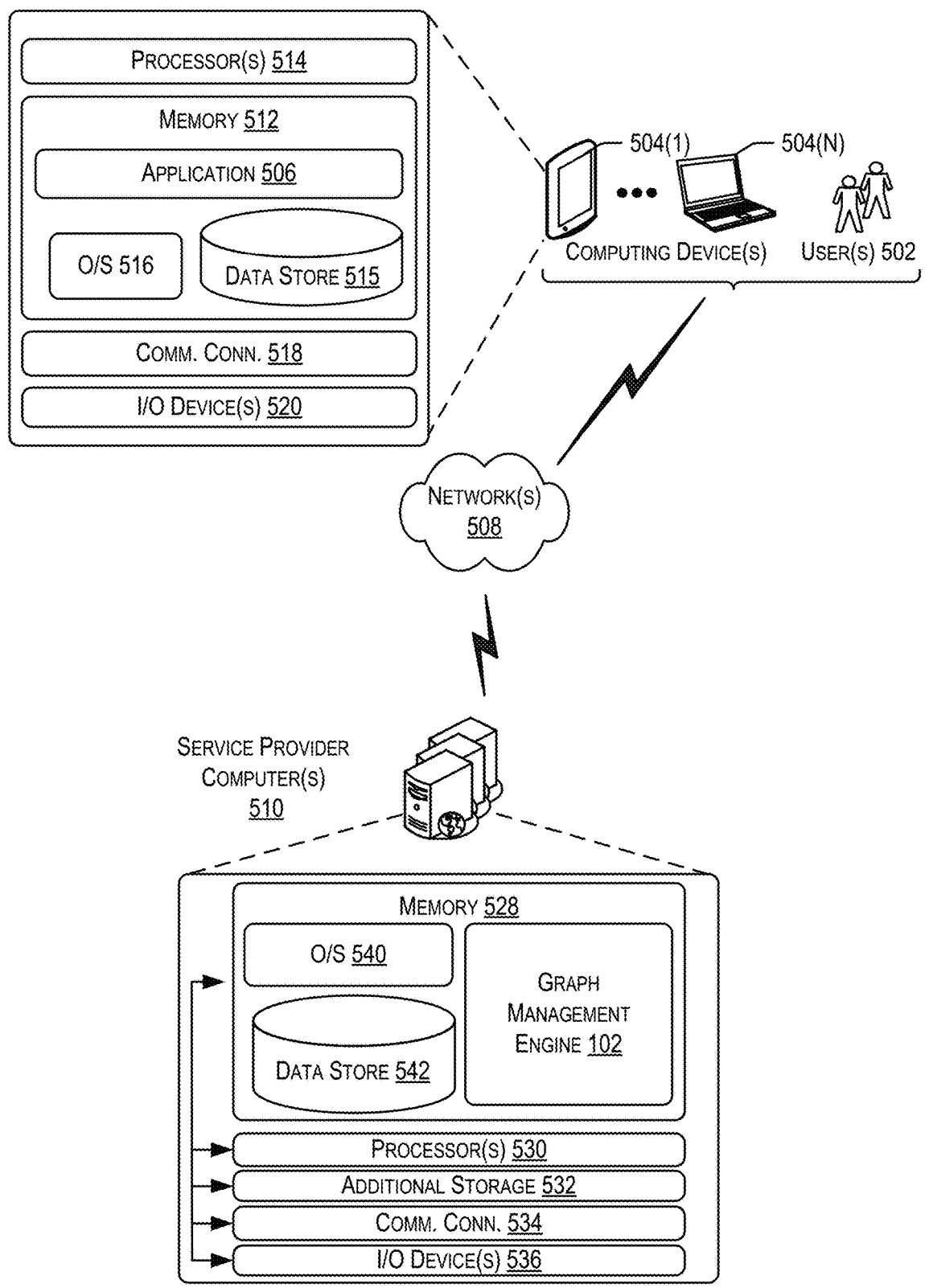
FIG. 5 illustrates components of a graph management system according to at least one embodiment.

FIG. 5 illustrates components of a graph management system 500 according to at least one embodiment. In graph management system 500, one or more user(s) 502 may utilize a computing device(s) 504(1)-(N) (e.g., a smartphone, a tablet, a laptop, a desktop computer, etc.) to request a graph information (e.g., any suitable number of nodes, edge, and/or attributes associated with the nodes and/or edges of the graph). It some embodiments, the computing device(s) 504 may be component of a vehicle (e.g., a car, a truck, a mobile drive unit, etc.) that may be configured to request graph information and utilize the provided graph information for route planning purposes. In some embodiments, the computing device(s) 504 may include one or more servers that are configured to request graph information and to identify potential routes based on the graph information received. As a non-limiting example, the computing device(s) 504 may be configured to receive a task assignment (e.g., from a task assignment system not depicted) identifying a task associated with a source location and a destination location. The graph management engine 102 may, in some embodiments, be a component of a task assignment system. In situations in which a data request for graph data is initiated by the user, the user may access a user interface accessible through an application 506 (e.g., a map application, a navigation application, a web browser, etc.) running on the computing device(s) 504 via one or more network(s) 508. In some embodiments, the computing device(s) 504 may access functionality of the graph management engine 102 via the application 506 and/or through various application programming interfaces (APIs) defining data exchanges between the computing device(s) 504 and the service provider computer(s) 510 and/or the graph management engine 102. In some aspects, the application 506 operating on the computing device(s) 504, and/or the APIs, may be hosted, managed, and/or provided by a computing resources service or service provider, such as by utilizing one or more service provider computer(s) 510.

In some examples, the network(s) 508 may include any one or a combination of many different types of networks, such as cable networks, the Internet, wireless networks, cellular networks, and other private and/or public networks. While the illustrated example represents the user(s) 502 accessing application functionality over the network(s) 508, the described techniques may equally apply in instances where the user(s) 502 interact with the service provider computer(s) 510 via the one or more computing device(s) 504 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the graph management engine 102, discussed further below in more detail, may operate in whole or in part on the computing device(s) 504. Thus, in some embodiments, the user(s) 502 and/or the computing device(s) 504 may access the functionality of the graph management engine 102 through components of the computing device(s) 504 (and/or the application 506) and/or the service provider computer(s) 510 via user interfaces and/or APIs provided by the graph management engine 102.

In some embodiments, the application 506 and/or APIs may allow the computing device(s) 504 to interact with the service provider computer(s) 510 so as to provide the various functionality described above with respect to the graph management engine 102. For example, a user (and/or the computing device itself) may request graph information corresponding to a particular location coordinate (e.g., latitude/longitude) and/or defined by location coordinate boundaries (e.g., latitude and longitude values). In at least one example, the application 506 may provide a network page and/or user interfaces with which the user(s) 502 may select and/or input a source location and/or destination location. The application 506 may be configured to identify a particular area corresponding to the source and destination locations (and potential areas in between such locations). In some embodiments, the application 506 may be configured to request graph information from the graph management engine 102 corresponding to a portion of the graph needed to provide route planning processing (e.g., portions of the graph including the source location, the destination location, and/or locations between the source location and destination location). In some embodiments, the application 506 (or another component of the computing device) may provide a source location and/or destination location based at least in part on a task assignment received from a task assignment system. In some embodiments, the application 506 may be configured to consult a cell version map previously provided by the service provider computer(s) 510 and stored within data store 515 to identify one or more cell identifiers (and/or one or more version identifiers for those cells) corresponding to the source/destination location. Accordingly, in some embodiments, the data request submitted by the application can include the identified cell identifiers (and/or version identifiers). In some embodiments, the graph management engine 102 may be configured to identify cells corresponding to the requested information even though cell identifiers and/or version identifiers may not be included in the request. The graph management engine 102 may utilize any suitable spatial projection formula and/or any stored version map to identify cell identifiers and/or version identifiers for graph cells relating to the request. The application 506 (or another component of the computing device) may be configured to transmit (electronically convey via a predefined API) a data request to the graph management engine 102, operating at the computing device(s) 504 and/or the service provider computer(s) 510. The application 506 may further be configured to receive, process, and/or display any suitable data (e.g., graph data) received from the service provider computer(s) 510 (e.g., nodes/edges/attributes of the nodes/edges associated with a portion of the graph related to the request).

The service provider computer(s) 510, perhaps arranged in a cluster of servers or as a server farm, may host the application 506 operating on the computing device(s) 504 and/or cloud-based software services. Other server architectures may also be used to host the application 506 and/or cloud-based software services. The application 506 operating on the computing device(s) 504 may be capable of handling requests from the user(s) 502 and serving, in response, various user interfaces that can be rendered at the computing device(s) 504. The application 506 operating on the computing device(s) 504 can present any suitable type of website that supports user interaction, including navigation websites and the like. The described techniques can similarly be implemented outside of the application 506, such as with other applications running on the computing device(s) 504.

The computing device(s) 504 may be any suitable type of computing device such as, but not limited to, a vehicle (e.g., a car, a truck, a train, a mobile drive unit, etc.), a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the computing device(s) 504 may be in communication with the service provider computer(s) 510 via the network(s) 508, or via other network connections.

In one illustrative configuration, the computing device(s) 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs.

Depending on the configuration and type of user computing device, the memory 512 may be volatile (such as random access memory (RAM)) and/or non-volatile (such as read-only memory (ROM), flash memory, etc.). The computing device(s) 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 516, one or more data stores 515, and one or more application programs, modules, or services for implementing the features of the graph management engine 102 disclosed herein, provided via the application 506 (e.g., a browser application, a navigation application, etc.). The application 506 may be configured to receive, store, and/or display a network page or other interface for interacting with the service provider computer(s) 510.

Additionally, the memory 512 and/or the data store 515 may be configured to store location information such as GPS coordinates and/or times associated with past route traversals. In some embodiments, the computing device(s) 504 may be configured to provide location information (e.g., in real time, from storage, etc.) to the service provider computer(s) 510 for further processing.

The computing device(s) 504 may also contain communications connection(s) 518 that allow the computing device(s) 504 to communicate with a stored database, another computing device or server (e.g., the service provider computer(s) 510), user terminals and/or other devices on the network(s) 508. The computing device(s) 504 may also include I/O device(s) 520, such as a keyboard, a mouse, a pen, a voice input device, a touch input device, a display, speakers, a printer, etc. Although not depicted, the computing device(s) 504 may include additional components such as a drive controller for controlling the movement of the computing device(s) 504. In these examples, the application 506 and/or another component of the computing device(s) may be configured to utilize graph data provided by the graph management engine 102 to provide a suggested route to any suitable component of the computing device(s) 504 (e.g., a drive controller) in order to effectuate traversal of the suggested route by the computing device(s) 504. The application 506, or another component of the computing device(s) 504 (e.g., a drive controller) may be configured to identify computer-executable instructions for causing the computing device(s) 504 to traverse the suggested route. In some embodiments, the application 506 may be configured to provide a change set to modify some portion of a graph maintained by the graph management engine 102.

In some aspects, the service provider computer(s) 510 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 510 may be in communication with the computing device(s) 504 and/or other service providers via the network(s) 508 or via other network connections. The service provider computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computer(s) 510, the memory 528 may be volatile (such as RAM) and/or non-volatile (such as ROM, flash memory, etc.). The service provider computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 510 may also contain communications connection(s) 534 that allow the service provider computer(s) 510 to communicate with a stored database, another computing device (e.g., the computing device(s) 504) or server, user terminals and/or other devices on the network(s) 508. The service provider computer(s) 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the graph management engine 102.

Figure 6:
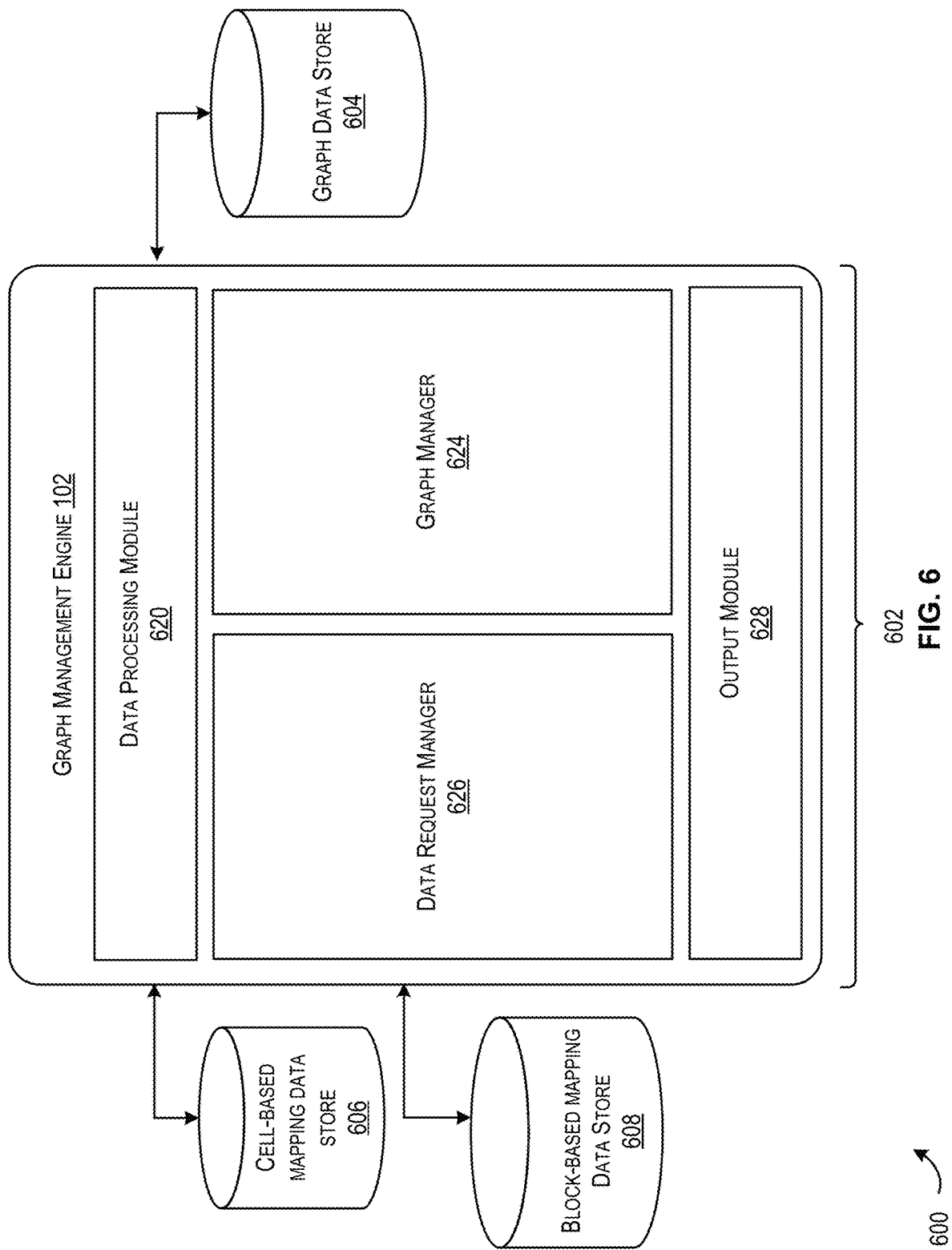
FIG. 6 is a schematic diagram of an example computer architecture for the graph management engine, including a plurality of modules that may perform functions in accordance with at least one embodiment.

FIG. 6 is a schematic diagram of an example computer architecture 600 for the graph management engine, including a plurality of modules that may perform functions in accordance with at least one embodiment. The modules 602 may be software modules, hardware modules, or a combination thereof. If the modules 602 are software modules, the modules 602 can be embodied on a computer readable medium and processed by a processor in any of the computer systems described herein. It should be noted that any module or data store described herein, may be, in some embodiments, be a service responsible for managing data of the type required to make corresponding calculations. The modules 602 may be exist as part of the graph management engine 102 operating on the service provider computer(s) 510 of FIG. 5, or the modules may exist as separate modules or services external to the service provider computer(s) 510 (e.g., as part of the application 506 of FIG. 5 operating on the computing device(s) 504 of FIG. 5).

In the embodiment shown in the FIG. 6, a graph data store 604, a cell-based mapping data store 606, and a block-based mapping data store 608) are shown, although data can be maintained, derived, or otherwise accessed from various data stores, either remote or local to the graph management engine 102, to achieve the functions described herein. In at least one embodiment, the data stores described herein may be physically located on the computing device(s) 504 of FIG. 5 or alternatively, any suitable combination of the data stores may be operated as part of the service provider computer(s) 510, for example, as part of an graph management engine 102. The graph management engine 102, as shown in FIG. 6, includes various modules such as a data processing module 620, a graph manager 622, a data request manager 626, and an output module 628. Some functions of the modules 602 are described below. However, for the benefit of the reader, a brief, non-limiting description of each of the modules is provided in the following paragraphs. In accordance with at least one embodiment, a process is identifying potential feature combinations for a new item.

In at least one embodiment, the graph management engine 102 includes the data processing module 620. Generally, the data processing module 620 may be utilized to receive any suitable information with respect to any example provided herein. The data processing module 620 may include any suitable number of application programming interfaces with which the functionality of the graph management engine 102 may be invoked.

For example, the data processing module 620 may be configured to one or more receive graphs (e.g., a geometric graph representing a road-network) from any suitable source. By way of example, the data processing module 620 may be configured to receive one or more graphs from one or more commercial graph providers. In some embodiments, the data processing module 620 may be configured to provide the received graph(s) to the graph manager 624 and/or to store the graph within the graph data store 604. The data processing module 620 may further be configured to receive requests for graph data. The data processing module 620 may further be configured to receive change set requests. A change set request may include any suitable number of requested changes (e.g., modification operations) to be performed on a previously-existing graph. Requests for graph data and/or change set requests may be received from any suitable source (e.g., other server computers, the computing device(s) 504 of FIG. 5, etc.). The data processing module 620 may be configured to invoke any suitable functionality of any suitable module of the modules 602 in response to receiving a request for graph data and or a change set request.

By way of example, the data processing module 620 may receive a request for graph data. The request for graph data may, in some embodiments, include at least a source location and/or a destination location. In some embodiments, the request may further include cell identifiers and/or version identifiers corresponding to particular cells of the graph. In still further embodiments, the request for graph data may further include a graph identifier corresponding to a particular graph and/or a particular version of a graph. The data processing module 620 may provide at least part of the request to another component of the graph management engine 102 (e.g., the graph manager 624 and/or the data request manager 626) to invoke functionality corresponding to the receiving component.

The graph manager 624 may be configured to manage a number of graphs contained within graph data store 604. By way of example, the graph manager 624 may be configured to maintain the graphs 105, 202, 204, and 206 of FIGS. 1 and 2. In some examples, the graph manager 624 may be configured to receive a graph and store the graph within the graph data store 604 such that the graph is retrievable for subsequent processing.

In some embodiments, the graph manager 624 may be configured to partition the graph into cells utilizing a spatial projection formula. In some embodiments, the graph manager 624 may utilize the spatial projection formula to identify blocks having a coarser granularity than the cells and including some set of the cells identified. In some embodiments, the blocks may be identified by the graph manager 624 by grouping a number of cells to form a block. The graph manager 624 may be configured to maintain cell objects and/or a content map and/or a version map associated with the cells. In some embodiments, the graph manager 624 may maintain more than one content map and version map associated with the cells. That is, the graph manager 624 could maintain a content map and corresponding version map for each version of a graph. In some embodiments, the graph manager 624 may further be configured to maintain block version maps related to groups of cells or lower level blocks as described in connection with FIG. 4.

In some embodiments, the graph manager 624 may be configured to perform operations associated with the techniques described above in connection with FIGS. 1 and 2. For example, the graph manager 624 may utilize a spatial projection formula to identify cell boundaries of a graph according to a particular (e.g., predetermined) level of granularity. The graph manager 624 may maintain any suitable number of cell objects that maintain any suitable cell content associated with a cell (e.g., attributes associated with vertices/nodes/edges located with the graph area associated with the cell). In some embodiments, a content map associated with one or more cells may be maintained by the graph manager 624 to document cell content contained with a cell boundary. The graph manager 624 may be further configured to maintain a version map associated with the cells. A version map may correspond to a particular version of a graph containing particular cell versions. The graph manager 624 may be configured to perform the operations described above in connection with FIG. 3 to generate and/or maintain these maps and/or cells/cell entries. Any suitable number of cells, content maps related to cell content, version maps related to cells, or any suitable data related to a cell may be stored within the cell-based mapping data store 606.

In some embodiments, the graph manager 624 may be configured to maintain any suitable number of blocks and/or block version maps. By way of example, the graph manager 624 may be configured to maintain multiple levels of blocks within a hierarchical structure (e.g., a tree) as described above in connection with FIG. 4. Block objects, block content maps, block version maps, or any suitable data related to a block may be stored within the block-based mapping data store 608. It should be appreciated that the cell-based data of the cell-based mapping data store 606 and the block-based mapping data store 608 may, in some embodiments, be stored in a common data store and/or storage location.

In some embodiments, the graph manager 624 may be configured to receive a change set associated with modification operations to be performed on a graph. The change set may be received from any suitable source. Specific operations to be performed on the graph may be provided within the change set request. In some embodiments, the graph manager 624 may receive a modified version of the graph and may ascertain the changes to be made to the graph data (e.g., cells, blocks, cell and/or block content maps, cell and/or block version maps, etc.). The graph manager 624 may be configured update (or generate new) content map entries for cells and/or blocks according to the modifications performed. In some embodiments, the graph manager 624 may be configured to update (or generate new) cell objects and/or blocks according to the modifications performed. The graph manager 624 may generate new version identifiers for cells and/or blocks according to the modifications performed and may maintain these new version identifiers in version maps corresponding to the cell(s) and/or blocks, respectively. The graph manager 624 may be configured to store these updated and/or new content and/or version maps within the cell-based mapping data store 606 and/or the block-based mapping data store 608 as appropriate.

In some embodiments, the graph manager 624 may be configured to publish a new version number of a most-recent version of the graph. In some embodiments, this may entail updating a graph version entry at a well-known path. In some embodiments, the graph manager 624 may utilize the output module 628 to identify and notify clients interested in becoming aware of graph updates by either publishing an event in a notification data-stream that interested clients are subscribed to, or by notifying clients directly through a subscription-based notification service, a.k.a. push notification Alternatively, clients can monitor the value of the graph-version entry by periodically polling the entry, a.k.a. pull notification.

In some embodiments, the graph manager 624 may be configured to store graph(s), instances of cells (e.g., cell objects), cell version maps, cell content maps, block version maps, block content maps, instances of a block (e.g., block objects) within a path-based data-storage system. Said another way, the data stores 604, 606, and/or 608 may be part of a path-based data-storage system. As discussed above, a path-based data storage system may be a cloud-based NoSQL database (e.g., Amazon's S3 Web Service, DynamoDB®, etc.). In some embodiments, each cell, block, graph, content map, version map, and the like may be stored as a single entry within the path-based storage system, where the path may be computed by the graph manager 624. For example, cell paths may be computed based on concatenating a base path associated with a cell map repository (e.g., the cell-based mapping data store 606) with a cell identifier and/or a version identifier. A path for a cell version map may be computed, for example, by concatenating the based path of the cell map repository with a version associated with the graph. In some embodiments, a path for a block may be computed, for example, by concatenating a base path of a block map repository (e.g., the block-based mapping data store 608), a block identifier, and a block version. In some embodiments, a path for a block version map may be computed, for example, by concatenating a base path of a block map repository (e.g., the block-based mapping data store 608), a block level, a block identifier, and/or a block version map identifier. In a path-based storage system, the path computed as described above may be utilized by the graph manager 624 to store and/or retrieve corresponding data. This may alleviate the graph manager 624 from identifying and performing SQL based queries. It should be appreciated that similar techniques as described in the figures above may also be implemented using a SQL-based storage system.

In some embodiments, the graph manager 624 may be configured to log histories associated with change set submissions and/or modifications performed, individual graph entries, cell modifications, block modifications, or the like. Such historical data may be stored in any suitable location (e.g., the data stores 606 and/or 608). In some embodiments, this historical data may be requested via the data processing module 620 and the data processing module 620 may be configured to provide the requested historical data to the output module 628 for transmitting the data to the requester and/or presenting the data via a user interface.

In some embodiments, the graph manager 624 may further be configured to enable branching of a change set. By way of example, a change set request may be associated with a particular branch. The graph manager 624 may generate a branch identifier and incorporate a branch identifier into graph version numbers and all path-based data-storage system path computations. With branching, the graph manager 624 may maintain a dedicated instance of the graph for each branch. By way of example, a different branch may be maintained and associated with change sets stemming from a particular source (e.g., a user, a server computer, etc.). The graph manager 624 may be configured to enable changes performed on one branch of graph data to other branched graph versions. In some embodiments, the graph manager 624 may prompt the user for merging input utilizing a user interface provided by the output module 628.

In some embodiments, the data request manager 626 may be configured to receive a request for graph data. The request may include one or more locations (e.g., a source location and/or a destination location associated with a route request). In some embodiments, the request may further include one or more cell identifier(s) and a version identifier associated with each cell identifier. In some embodiments, the cell identifier(s) may include the version identifier.

According to some embodiments, the data request manager 626 may be configured to identify the cell identifier(s) and the version identifier(s) corresponding to cells of the graph from the data provided in the request. In some embodiments, the data request manager 626 may be configured to identify cell identifier(s) and the version identifier(s) utilizing location coordinates provided in the request. By way of example, the location(s) provided in the request may be utilized with a spatial projection formula to identify a corresponding cell identifier. The cell identifier may be utilized by the data request manager 626 to identify a version identifier for the cell as provided in a version map associated with the cell. In either scenario the cell identifier and the version identifier may be utilized to retrieve cell contents associated with the particular instance of the cell. The cell contents may be retrieved from a cell content map and/or a cell object as described above in connection with FIG. 3.

In some embodiments, the request may include a block identifier and/or a block version identifier. In other embodiments, the data request manager 626 may be configured to utilize the location and spatial projection formula to identify cell identifiers from which block identifiers may be ascertained and/or the block identifiers themselves. The data request manager 626 may utilize block identifiers to determine a current version for the block by consulting a block version map. Based on a block version map, the data request manager 626 may retrieve corresponding cell content corresponding to cells (e.g., cell entries and/or cell objects) associated with the block. Any retrieved content (e.g., cell content and/or block content) may be provided by the data request manager 626 to the output module 628 for output processing.

According to some embodiments, the output module 628 may be configured to provide any suitable data from the graph management engine 102 to any suitable computing device. The output module 628 may be configured to provide any suitable type and/or number of user interface(s) from which the data provided by the graph management engine 102 may be presented. By way of example a data request for graph data may be provided by a particular computing device (e.g., of the computing device(s) 504 of FIG. 5). The output module 628 may be configured to cause the requested graph data (e.g., nodes, edges, attributes of nodes/edges corresponding to one or more cells of the graph) to be rendered via a user interface provided at the computing device.

Figure 7:
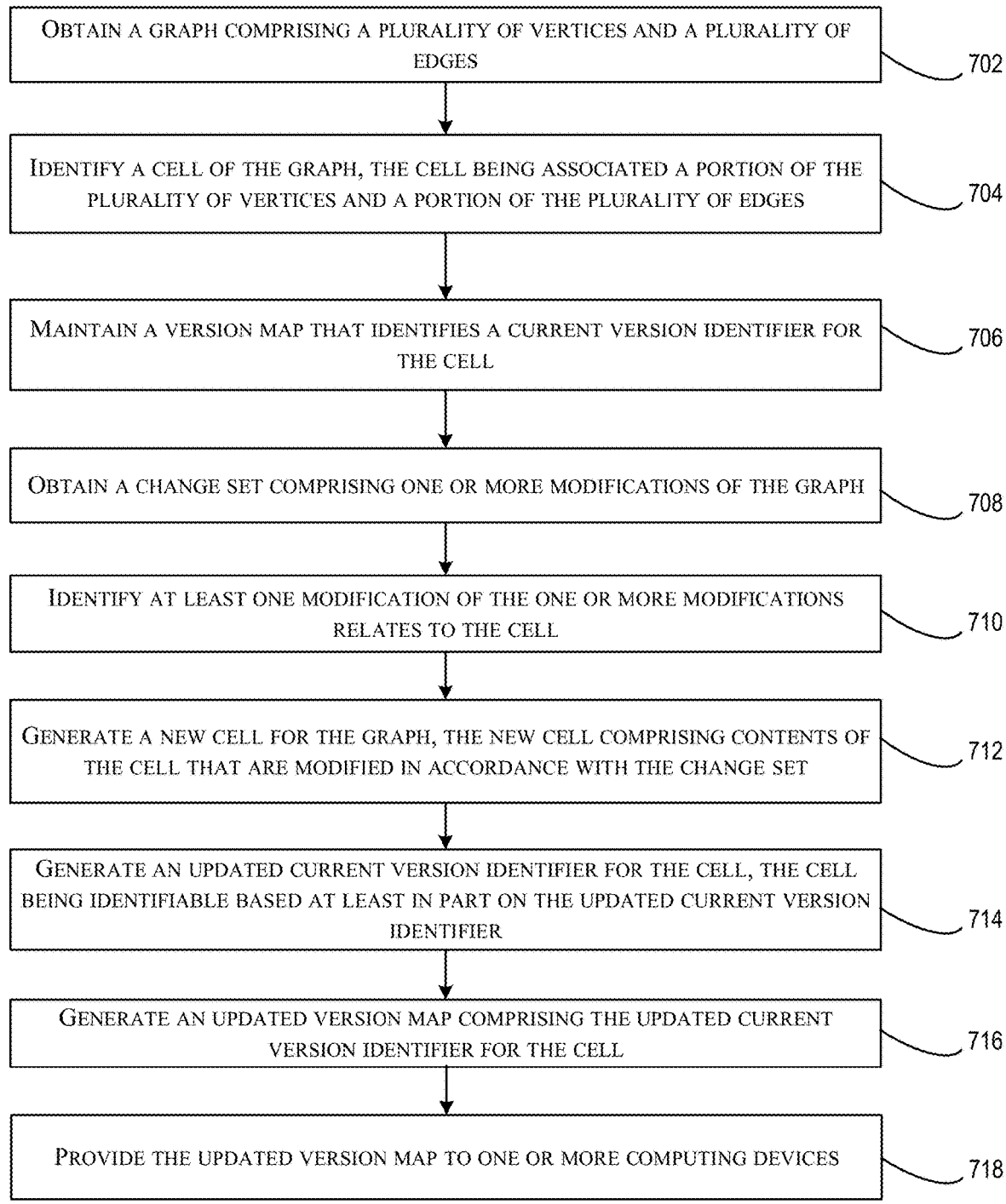
FIG. 7 is a flowchart illustrating an example method for maintaining a version map, in accordance with at least one embodiment.

FIG. 7 is a flowchart illustrating an example method 700 for maintaining a version map, in accordance with at least one embodiment. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by a computing device (e.g., the computing device(s) 504 of FIG. 5 and/or the service provider computer(s) 510 of FIG. 5) at which at least a portion of the graph management engine 102 is executed. The computing device may include a processor and a memory storing computer-readable instructions that, upon execution by the processor, configure the computing device to perform the operations of the method 700.

The method 700 may begin at 702, where a graph may be obtained (e.g., by the data processing module 620 of FIG. 6). The graph may comprise a plurality of vertices (e.g., nodes) and a plurality of edges. In some embodiments, the graph being associated with a geographic region (e.g., the world, a country, a state, a city, a county, or any suitable geographic region). The graph data of the graph may include identification of vertices (e.g., nodes), edges, and/or any suitable attributes associated with the vertices and/or edges. In some embodiments, the graph, along with the identification of the vertices and/or edges and their associated attributes, may be originally generated by (or obtained from) a commercial graph provider.

At 704, a cell of the graph may be identified (e.g., by the graph manager 624). For example, the cell may be identified based at least in part on spatial projection (e.g., utilizing a spatial projection formula). In some embodiments, the cell may be associated with a sub-region of the graph and a portion of the plurality of vertices and a portion of the plurality of edges. As a non-limiting example, the graph manager 624 may apply a spatial projection formula (e.g., a rectilinear projection formula, a spherical mercator index formula, etc.) to the graph to sub-divide the graph into a plurality of cells corresponding to spatial indices generated by the spatial projection formula. In some embodiments, the cell contents (e.g., vertices/nodes, edges, of the graph) may mapped to each cell by the graph manager 624. By way of example, each location associated with a vertex (node) and/or edge may be provided to the spatial projection formula to identify a cell to which the vertex and/or edge related. The graph manager 624 may update a cell content map (or a cell object depending on the implementation) to contain an identifier for the vertex and/or edge. In some embodiments, the cell may be associated with any suitable number of vertices and/or edges. A cell, in some cases, may be associated with zero vertices and/or edges.

At 706, a version map (e.g., a cell version map) may be maintained (e.g., by the graph manager 624). In some embodiments, the version map identifies a current version identifier for the cell. Accordingly to some embodiments, the graph manager 624 may generate version identifiers for each cell of the graph and these version identifiers may be maintained via the version map (e.g., see version maps 304, 316, and 328 of FIG. 3).

At 708, a change set comprising one or more modifications of the graph may be obtained (e.g., by the graph manager 624). The change set may be obtained from any suitable source. As described above, the change set may include any suitable number of modifications to be performed on the graph. These operations may include, among others, additions, removals, and/or modifications of graph data related to cells (or blocks) associated with the graph.

At 710, at least one modification of the one or more modifications may be identified (e.g., by the graph manager 624) as being related to the cell.

At 712, a new cell of the graph may be generated (e.g., by the graph manager 624). In some embodiments, a new cell may be considered a new object or a new entry within a cell content map (e.g., the content map 310 of FIG. 3). In some embodiments, the new cell (object or entry) comprises contents of the cell that are modified in accordance with the change set. In some embodiments, the new cell (object or entry) may be generated in response to the determination at 710.

At 714, an updated current version identifier for the cell may be generated (e.g., by the graph manager 624). In some embodiments, the cell may be identifiable based at least in part on the updated current version identifier. By way of example, the graph manager 624 may increment the previous cell identifier to generate the current version identifier.

At 716, an updated version map may be generated (e.g., by the graph manager 624). In some embodiments, the updated version map may comprise the updated current version identifier for the cell. An example of this step may be provided in the description of FIG. 3 where an updated version map (e.g., version map 328) is generated in response to a change set to the graph 306.

At 718, the updated version map may be provided (e.g., by the graph manager 624 and/or the output module 628) to one or more computing devices. By way of example, the graph manager 624 may be associated the updated version map with a particular graph identifier. The graph identifier may indicate a version of the graph. The updated version map may be provided to the output module 628 which in turn may publish a new version number of a most-recent version of the graph. In some embodiments, this may entail updating a graph version entry at a well-known path. In some embodiments, the output module 628 may be configured to identify (e.g., via topic preferences) clients who are interested in changes to the graph. The output module 628 may further be configured to notify those clients of graph updates by either publishing an event in a notification data-stream that interested clients are subscribed to, or by notifying clients directly through a subscription-based notification service, a.k.a. push notification Alternatively, clients can monitor the value of the graph-version entry by periodically polling the entry, a.k.a. pull notification.

Although not depicted in FIG. 7, a data request may be received from another computing device. The data request may request graph data corresponding to some suitable portion of the graph. The data request manager 626 of FIG. 6 may be utilized to identify the cells to which the data request corresponds and/or the cell identifier for the requested content may be provided in the data request. The data request manager 626 may retrieve a most-current version (as identified in the cell version map) of the cell content corresponding to the cell identifier. The cell content may be provided in response to the data request.

Figure 8:
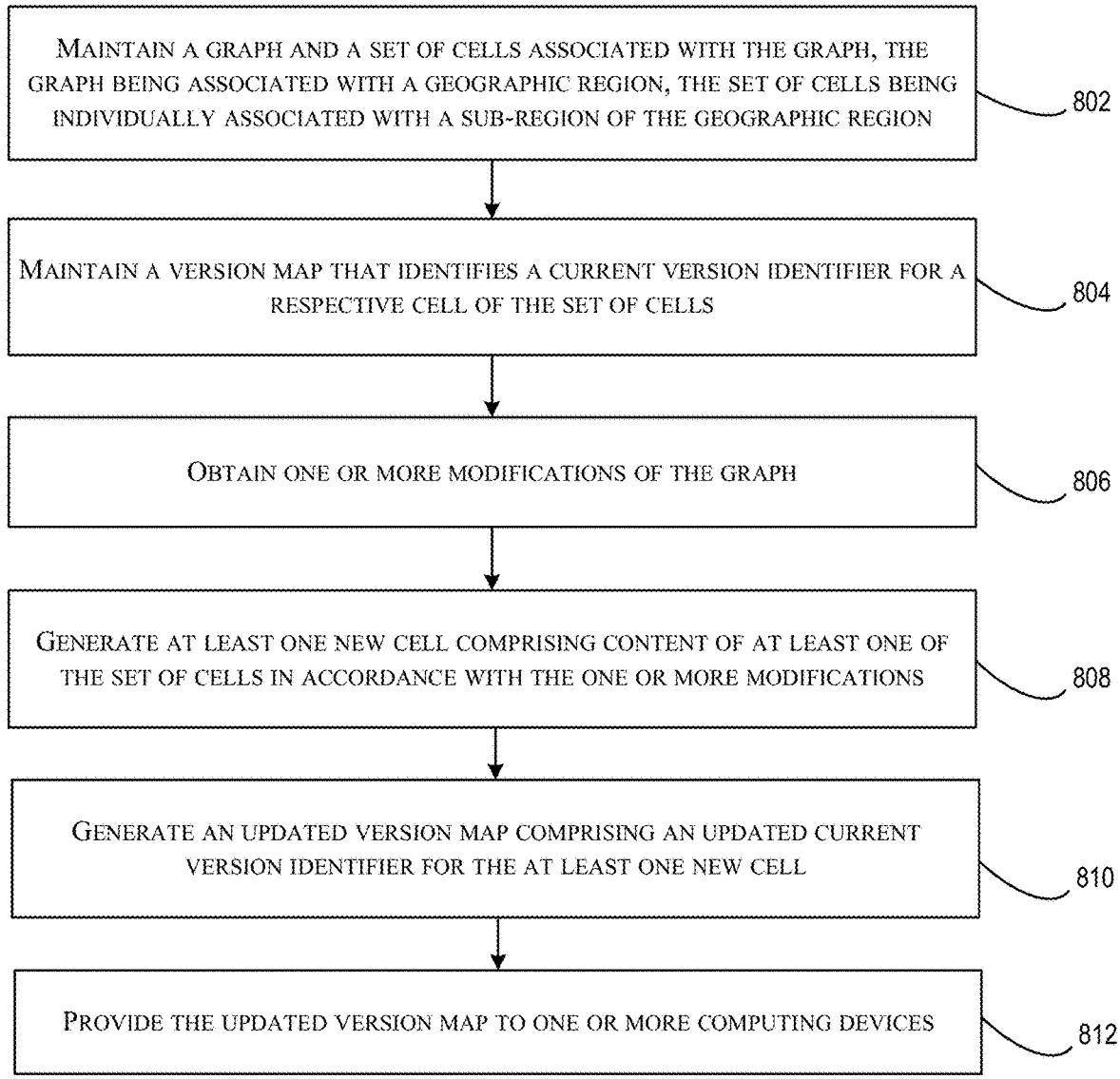
FIG. 8 is a flowchart illustrating another example method for maintaining a version map, in accordance with at least one embodiment.

FIG. 8 is a flowchart illustrating another example method 800 for maintaining a version map, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a computing device (e.g., the computing device(s) 504 of FIG. 5 and/or the service provider computer(s) 510 of FIG. 5) at which at least a portion of the graph management engine 102 is executed. The computing device may include a processor and a memory storing computer-readable instructions that, upon execution by the processor, configure the computing device to perform the operations of the method 800.

The method 800 may begin at 802, where a graph (e.g., a road-network graph) and a set of cells associated with the graph are maintained (e.g., by the graph manager 624 of FIG. 6). As a non-limiting example, the techniques described above in connection with FIG. 3 may be utilized to maintain a graph and a corresponding set of cells for the graph. In some embodiments, the graph may be associated with a geographic region (e.g., a country, a city, the world, or any suitable geographic area). In some embodiments, the set of cells may be individually associated with a sub-region of the geographic region. The sub-region may be smaller than the geographic region. In some embodiments, the set of cells and the cell identifiers may be generated based at least in part on a spatial projection of the graph (e.g., by applying a spatial projection formula to the graph).

At 804, a version map may be maintained (e.g., by the graph manager 624). In some embodiments, the version map (e.g., version map 316 of FIG. 3) identifies a current version identifier for a respective cell of the set of cells.

At 806, one or more modifications of the graph may be obtained (e.g., by the graph manager 624). The one or more modifications may be provided from any suitable source. For example, the one or more modifications may be provided by a graph provider of the original graph.

At 808, at least one new cell may be generated (e.g., by the graph manager 624). A new cell may comprise content of at least one of the set of cells in accordance with the one or more modifications. For example, a previous version of a cell may be duplicated and the attributes stored as a new cell and the modifications may then be applied. Accordingly, in some embodiments, a new cell may include unmodified attributes of the previous cell along with modified attributes of the previous cell.

At 810, an updated version map may be generated (e.g., by the graph manager 624). In some embodiments, the updated version map may comprise an updated current version identifier for the at least one new cell.

At 812, the updated version map may be provided (e.g., by the output module 628) to one or more computing devices.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computing device, a graph comprising a plurality of vertices and a plurality of edges, the graph being associated with a geographic region;
    identifying, by the computing device, a cell of the graph, the cell being identified based at least in part on partitioning the graph into a set of cells utilizing a spatial projection algorithm, each of the set of cells being assigned a corresponding cell identifier, the cell being associated with a sub-region of the graph, the cell being associated with a portion of the plurality of vertices and a portion of the plurality of edges;
    maintaining, by the computing device, a version map that identifies a current version identifier for each of the set of cells;
    receiving, by the computing device, a change set comprising one or more modifications of the graph;
    identifying, by the computing device, that at least one modification of the one or more modifications relates to the cell based at least in part on a cell identifier and a version identifier either provided with the change set or identified utilizing the spatial projection algorithm;
    retrieving, from memory, content of the cell based at least in part on identifying the cell utilizing the cell identifier and the current version identifier;
    generating, by the computing device, a new cell of the graph, the new cell comprising the content of the cell as modified in accordance with the change set, the new cell being associated with the cell identifier;
    generating, by the computing device, an updated current version identifier for the cell, the cell being identifiable based at least in part on the updated current version identifier;
    generating, by the computing device, an updated version map comprising the updated current version identifier for the new cell; and
    providing, by the computing device, the updated version map to one or more computing devices, whereby providing the updated version map to the one or more computing devices configures the one or more computing devices to direct a subsequent modification request to a specific version of the cell corresponding to specific cell content.

2. The computer-implemented method of claim 1, further comprising:
    receiving, by the computing device, an additional graph request, the additional graph request comprising a particular cell identifier associated with a particular cell of the set of cells, the additional graph request further comprising a particular cell version identifier;
    retrieving, by the computing device, cell content corresponding to the particular cell identifier and the particular cell version identifier; and
    providing, by the computing device, the cell content retrieved.

3. The computer-implemented method of claim 2, wherein each of the set of cells comprises content including at least one vertex of the graph and at least one edge of the graph.

4. The computer-implemented method of claim 1, wherein the spatial projection algorithm comprises at least one of: a rectilinear projection formula or a spherical mercator index formula.

5. A computing device, comprising:
    a processor; and
    a memory storing computer-readable instructions that, upon execution by the processor, configure the computing device to:
        maintain a graph and a set of cells associated with the graph, the graph being associated with a geographic region, the set of cells being individually associated with a sub-region of the geographic region and a corresponding cell identifier;
        maintain a version map that identifies a current version identifier for a respective cell of the set of cells;
        receive a graph request comprising one or more modifications of the graph;
        retrieve content of a cell based at least in part on identifying the cell utilizing a cell identifier and a version identifier received with the one or modifications or identified using a spatial projection algorithm;
        generate a new cell comprising the content of the cell as modified in accordance with the one or more modifications received in the graph request, the new cell being associated with the cell identifier;
        generate an updated version map comprising an updated current version identifier for the new cell, the new cell being identifiable based at least in part on the updated current version identifier; and
        provide the updated version map to one or more computing devices whereby providing the updated version map to the one or more computing devices configures the one or more computing devices to direct a subsequent modification request to a specific version of the cell corresponding to specific cell content.

6. The computing device of claim 5, wherein the computer-readable instructions further configure the computing device to:
    obtain a subsequent set of modifications of the graph;
    generate at least one subsequent cell comprising content of at least one of the set of cells as modified in accordance with the subsequent set of modifications;
    generate a new updated version map comprising newly updated current version identifiers for the at least one subsequent cell; and
    provide the new updated version map to the one or more computing devices.

7. The computing device of claim 5, wherein the cell identifier is generated based at least in part on a spatial projection of the graph.

8. The computing device of claim 5, wherein the graph represents a road-network graph.

9. The computing device of claim 5, wherein the computer-readable instructions further configure the computing device to:
receive an additional graph request comprising a particular cell identifier associated with a particular cell of the set of cells, the additional graph request further comprising a requested cell version identifier;
obtain cell content corresponding to the particular cell identifier and the requested cell version identifier, wherein the cell content is obtained utilizing the version map to identify the cell content corresponding with the cell identifier and the requested cell version identifier; and
provide the cell content obtained.

10. The computing device of claim 5, wherein the graph request is received from a user device, and wherein the content is provided to the user device.

11. The computing device of claim 5, wherein the computer-readable instructions further configure the computing device to:
maintain a cell content map for the set of cells, the cell content map associating a particular cell identifier to particular content of a particular cell of the set of cells, the particular content comprising at least one of: one or more vertices of the graph or one or more edges of the graph, wherein the content is obtained further utilizing the cell content map for the set of cells.

12. The computing device of claim 5, wherein the computer-readable instructions further configure the computing device to:
maintain a cell block map associated with the graph, the cell block map associating a block identifier with a group of cells of the graph, wherein the graph request further comprises a cell block identifier, and wherein the cell content is retrieved further utilizing the cell block map and the cell block identifier.

13. The computing device of claim 12, wherein retrieving the content utilizing the cell block identifier configures the computing device to obtain the content independent of retrieving other content of the graph.

14. A computer-readable storage medium having stored thereon computer-executable instructions that, when executed by a processor, cause the processor to perform operations comprising:
maintaining a graph and a set of cells associated with the graph, the graph being associated with a geographic region, the set of cells being individually associated with a sub-region of the geographic region, each of the set of cells being assigned a corresponding cell identifier;
maintaining a version map that identifies a current version identifier for a respective cell of the set of cells;
receiving a graph request comprising one or more modifications of the graph;
retrieving content of a cell based at least in part on identifying the cell utilizing a cell identifier and a version identifier received with the one or modifications or identified using a spatial projection algorithm;
generating a new cell comprising modified content, the modified content comprising the content as modified in accordance with the one or more modifications;
generating an updated version map comprising an updated current version identifier for the new cell, the new cell being identifiable based at least in part on the updated current version identifier; and
providing the updated version map to one or more computing devices, whereby providing the updated version map to the one or more computing devices configures the one or more computing devices to direct a subsequent modification request to a specific version of the cell corresponding to specific cell content.

15. The computer-readable storage medium of claim 14, wherein the processor performs further operations comprising:
maintaining a block version map that identifies a current block version identifier for a plurality of blocks individually associated with respective groups of cells;
identifying a block that comprises the cell
generating a new block associated with the block; and
assigning the new block a new current block version identifier.

16. The computer-readable storage medium of claim 15, wherein the version map, the block version map, and the set of cells are stored in a path-based data-storage system.

17. The computer-readable storage medium of claim 14, wherein the processor performs further operations comprising:
receiving an additional graph request comprising a particular cell identifier associated with a particular cell of the set of cells, the graph request further comprising a particular cell version identifier;
requesting, from a no-SQL database, cell content associated with the particular cell identifier and the particular cell version identifier;
receiving, from the no-SQL database, the cell content associated with the particular cell identifier and the particular cell version identifier; and
providing the cell content to the one or more computing devices.

18. The computer-readable storage medium of claim 17, wherein requesting the cell content comprises a query to the no-SQL database, the query comprising a concatenation of a base path of a cell repository, the cell identifier, and the particular cell version identifier.

19. The computer-readable storage medium of claim 14, wherein providing the updated version map to the one or more computing devices comprises:
providing a version map identifier associated with the updated version map of the graph, wherein the version map identifier is provided at a predefined storage location accessible to the one or more computing devices.

20. The computer-readable storage medium of claim 14, wherein the graph, the version map, and the set of cells are maintained to enable decentralized and concurrent readings of the graph.

* * * * *

UNITED STATES PATENT AND TRADEMARK OFFICE
CERTIFICATE OF CORRECTION

PATENT NO. : 11,126,658 B1
APPLICATION NO. : 16/129643
DATED : September 21, 2021
INVENTOR(S) : Robert Niewiadomski Page 1 of 1

It is certified that error appears in the above-identified patent and that said Letters Patent is hereby corrected as shown below:

In the Claims

Column 27, Line 40, Claim 12:
Delete: "the cell content is retrieved further utilizing the cell"
Insert: --the content is retrieved further utilizing the cell--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*